United States Patent [19]

Toyota et al.

[11] Patent Number: 4,777,356
[45] Date of Patent: Oct. 11, 1988

[54] READER FOR OPTICAL TYPE RECORD CARD

[75] Inventors: Kiyoshi Toyota; Minoru Ishida, both of Shinagawa, Japan

[73] Assignee: Sony Corporation, Tokyo, Japan

[21] Appl. No.: 905,586

[22] PCT Filed: Dec. 5, 1985

[86] PCT No.: PCT/JP85/00669
§ 371 Date: Aug. 4, 1986
§ 102(e) Date: Aug. 4, 1986

[87] PCT Pub. No.: WO86/03611
PCT Pub. Date: Jun. 19, 1986

[30] Foreign Application Priority Data

Dec. 10, 1984 [JP] Japan .................. 59-260398

[51] Int. Cl.$^4$ ............................................. G06K 9/00
[52] U.S. Cl. ........................................ 235/454; 235/470
[58] Field of Search ................ 235/436, 454, 470; 250/216, 566, 569; 350/247; 356/147, 400; 382/46

[56] References Cited

FOREIGN PATENT DOCUMENTS 137426 11/1976 Japan .

Primary Examiner—A. D. Pellinen
Assistant Examiner—Leon K. Fuller
Attorney, Agent, or Firm—Hill, Van Santen Steadman & Simpson

[57] ABSTRACT

An optical type record card reader according to the present invention is provided with a line sensor (10) for reading an information by a reflected light from a track of an optical type record card (1) irradiated by a light source (4) and in which optical type record card an information is recorded on a record medium (1A) as a plurality of parallel tracks which can be read out optically, a cylindrical lens (11) located rotatably between the optical type record card (1) and the line sensor (10) and an azimuth error detecting circuit for detecting an azimuth error generated between the track and the line sensor (10), wherein the cylindrical lens (11) is rotated by the detected output of the azimuth error detecting circuit to thereby correct the azimuth error. Thus, it becomes possible to correct the azimuth error of the projected image a sub-track of the optical type record card onto the line sensor smoothly, highly precisely and rapidly by the rotation of the cylindrical lens.

5 Claims, 6 Drawing Sheets

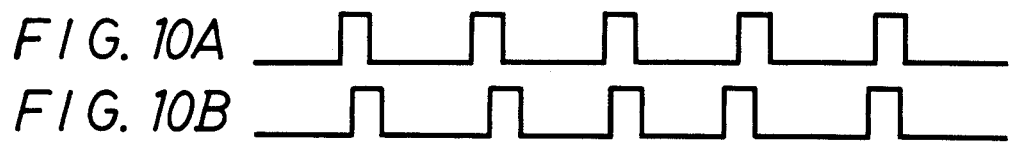
FIG. 10A
FIG. 10B
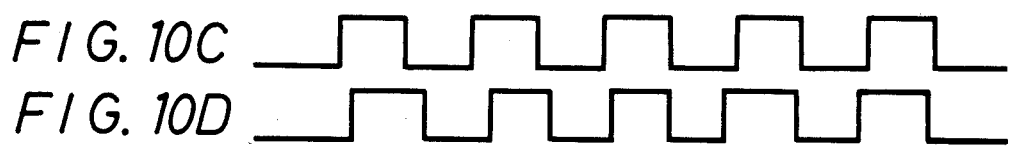
FIG. 10C
FIG. 10D
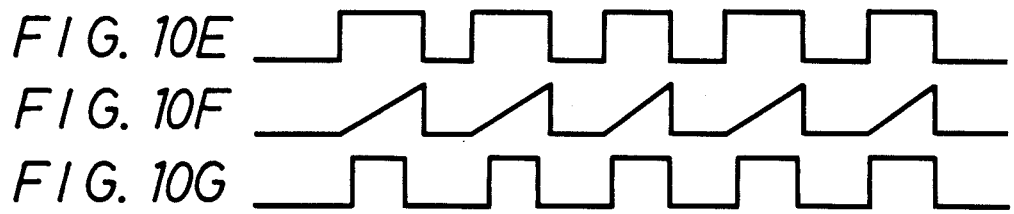
FIG. 10E
FIG. 10F
FIG. 10G
FIG. 10H
FIG. 10I.

READER FOR OPTICAL TYPE RECORD CARD

TECHNICAL FIELD

The present invention relates to a reader for an optical type record card.

BACKGROUND ART

There is an optical type record card called memory card, a software card or the like. A prior art card of this kind will be described first with reference to FIG. 11. Reference numeral 1 generally designates an optical type record card. In this card 1, a main track $T_M$ of a band-shape is formed rectilinearly on a rectangular card substrate (record medium) 1A along its longitudinal direction. The main track $T_M$ is formed of the alignment of a plurality of sub-tracks $T_S$ which are parallel to each other. Further, each sub-track $T_S$ is formed of the alignment of pits P as a plurality of optical dot-shaped recorded marks as shown in FIG. 12. Each sub-track $T_S$ is located perpendicularly to its alignment direction, that is, the longitudinal direction of the main track $T_M$. On each sub-track $T_S$, there is recorded a unit signal amount of a digitized signal of an information signal such as, video, audio, data signals and the like on the basis of the presence or absence of the pit P and the difference of the spacing between the pits.

Although the pit P is a concavity on a light reflection layer formed on the card substrate 1A, as an optical dot-shaped recorded mark, it may be possible to obtain a recorded mark formed on the basis of the difference between light reflectivities provided by the phase transfer between the crystal and amorphous on a layer of, for example, $TeOx_{(x\approx 1)}$.

Reference numerals 1a and 1b designate both side edges of the card substrate 1A and which are formed as the straight lines parallel to the main track $T_M$. One side edge 1a is taken as a reference side edge. The respective side surfaces at both the side edges 1a and 1b of the card substrate 1A construct the planes perpendicular to the front and back surfaces of the card substrate 1A which are made parallel to each other.

Subsequently, an optical type record card reader for reading from the card 1 the information signal recorded on the main track $T_M$ will be described with reference to FIGS. 13 and 14. The card 1, which is entered through the insertion slot to the inside of the reader, is transported along the reference side edge 1a of the card 1 to the direction shown by an arrow 3 by card transport rollers 2. An irradiation light 5 from a light source 4 irradiates the track $T_M$ of the card 1 through a condenser lens 6 and a reflected light from the track $T_M$, that is, a read light 7 of the track $T_M$ is irradiated through a focusing lens 8 to a line sensor 10 supported by a supporting plate 9, whereby the information signal is read out. The line sensor 10 is formed of a CCD (charge coupled device). This is formed such that a plurality of detection elements 10a are arranged rectilinearly and from which an image projected thereon is read out by the electronic scanning. On the line sensor 10, the longitudinal direction of the image of the sub-track $T_S$ coincides with the alignment direction of the detection elements 10a and images P' of all the pits P of one sub-track $T_S$ are focused simultaneously on the photo detector 10 so that the information signal of one sub-track $T_S$ amount is read out at the same time.

FIG. 15 shows a corresponding relationship between the line sensor 10 and the images P' of the pits P projected thereon.

By the way, while the optical type record card 1 is being transported, if the projected image of the sub-track $T_S$ to the line sensor 10 has an azimuth error relative to the line sensor 10, it becomes impossible to read the information of the sub-track $T_S$.

Therefore, in the prior art, the azimuth error is corrected, that is, the azimuth error is reduced to zero by rotating the line sensor 10. In this case, in practice, the substrate on which the line sensor 10, its driver, amplifier and the like are mounted must be rotated. In addition, because of the presence of the cords for the power source and the signal, it is very difficult to correct the azimuth error by rotating the line sensor 10 smoothly, highly precisely and rapidly.

In view of such aspect, the present invention is to provide the optical type record card reader which can correct the azimuth error of the projected image of the sub-track on the optical type record card to the line sensor smoothly, highly precisely and rapidly.

DISCLOSURE OF INVENTION

The present invention is characterized by a light source for irradiating a track of an optical type record card in which an information is recorded on a record medium in the form of a plurality of tracks parallel to one another and which can be optically read, a line sensor for reading the information by a reflected light from the track, a cylindrical lens located between the optical type record card and the line sensor and supported so as to be freely rotatable, an azimuth error detecting circuit for detecting an azimuth error occurring between the track and the line sensor and driving means for driving the cylindrical lens by the detected output of the azimuth error detecting circuit.

BRIEF DESCRIPTION OF DRAWINGS

FIG. 10 is a waveform diagram useful for the explanation thereof.

BEST MODE FOR CARRYING OUT THE INVENTION

Figure 1:
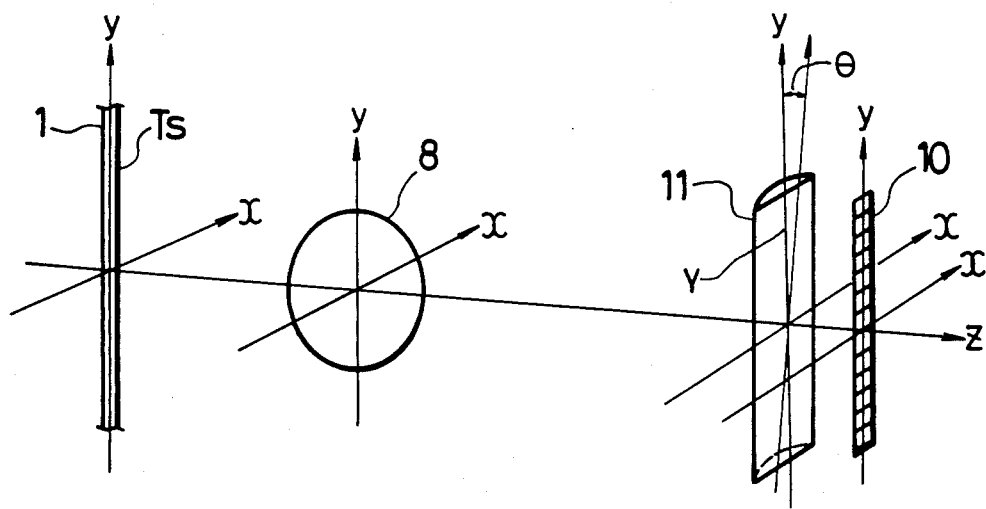
FIG. 1 is a locational diagram showing one embodiment of the present invention.

A fundamental embodiment of the present invention will hereinafter be described with reference to FIG. 1. In the figure, like parts corresponding to those of FIGS. 11 to 15 are marked with the same references and the overlapping explanation thereof will be omitted. Reference numeral 11 designates a cylindrical lens which is located between the focusing lens 8 and the line sensor 10.

An xyz orthogonal coordinate system is provided, and along the z axis, there are sequentially located the optical type record card 1, the focusing lens 8, the cylindrical lens 11 and the line sensor 10 with predetermined distances. And, the respective elements are located in such a manner that the recording surface of the optical type record card 1, the cross section of the focusing lens 8 perpendicular to its optical axis, the plane of the cylindrical lens 11 and the light receiving surface of the line sensor 10 each exist on the xy plane. In this case, when the projected image of the sub-track $T_S$ to the line sensor 10 is inclined relative to the line sensor 10, the cylindrical lens 11 is rotated on the xy plane to thereby correct the azimuth error thereof.

Accordingly, referring to FIG. 2, the following discussion will be given on a case in which how much angle the image of the sub-track $T_S$ on the line sensor 10 will be inclined when the longitudinal direction of each of the sub-track $T_S$ and the line sensor 10 is made coincident with the y axis and when the longitudinal direction of the cylindrical lens 11 is inclined relative to the y axis by $\theta$ radian within the xy plane.

Figure 2:
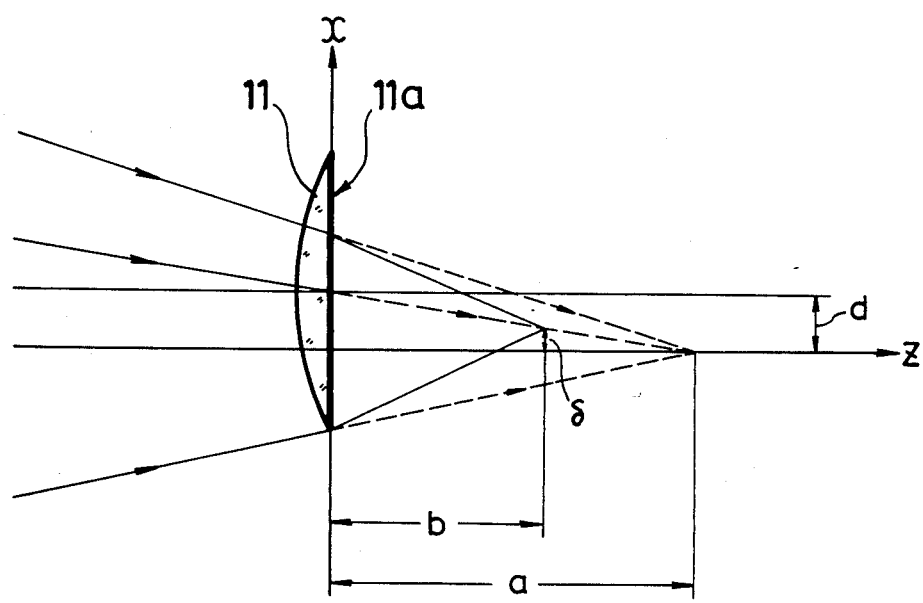
FIG. 2 is a diagram used to explain its optical system.

FIG. 2 shows a light path of a light which passes through the lens 11 when the cylindrical lens 11 is cut out by the xz plane in which y=Y is satisfied. Reference letter d in FIG. 2 designates the displacement amount (length) of the position at y=Y from the z axis when a plane 11a of the cylindrical lens 11 is inclined by $\theta$ within the xy plane. When there is provided no cylindrical lens 11, the light from the focusing lens 8 is traveled so as to be focused at the position on the z axis with a distance a from the plane 11a of the cylindrical lens 11. On the contrary, when the cylindrical lens 11 is provided, it is assumed that the light from the focusing lens 8 is refracted by this cylindrical lens 11 and is focused at the position apart by a distance b (this becomes the distance between the cylindrical lens 11 and the line sensor 10) on the z axis from the plane 11a of the cylindrical lens 11 and distant from the z axis by $\delta$.

Accordingly, if the focal length of the cylindrical lens 11 is taken as f, the following equation is established among a, b, and f from the formula of the lens.

$$\frac{1}{b} - \frac{1}{a} = \frac{1}{f} \tag{1}$$

Further, the $\delta$ is expressed by the following equation.

$$\delta = \frac{a-b}{a} \cdot d = \frac{a-b}{a} \cdot Y \tan \theta \tag{2}$$

Accordingly, it will be clear that the $\delta$ is proportionate to the Y. If the rotation angle of the image of the sub-track $T_S$ relative to the y axis when the cylindrical lens 11 is rotated relative to the y axis by the $\theta$ is taken as $\alpha$ radian, the $\alpha$ is expressed by the following equation.

$$\tan \alpha = \frac{\delta}{Y} = \frac{a-b}{a} \cdot \tan \theta \tag{3}$$

Here, if the $\alpha$ and $\theta$ are sufficiently small, the Eq. (3) is approximated as the following equation.

$$\alpha \approx \frac{a-b}{a} \cdot \theta \tag{4}$$

For example, let it be assumed that f=40 (mm), a=20 (mm) and b=13.3 (mm). Then, (a−b)/a becomes 0.33. Accordingly, if the cylindrical lens 11 is rotated by 1° within the xy plane, the image of the sub-track $T_S$ is rotated by 0.33°.

Figure 3:
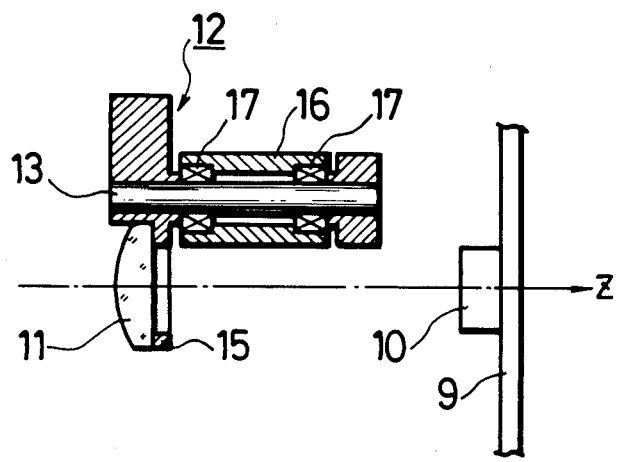
FIGS. 3 and 4 are a longitudinal cross-sectional view and a lateral cross-sectional view respectively showing an example of driving means for a cylindrical lens.
Figure 4:
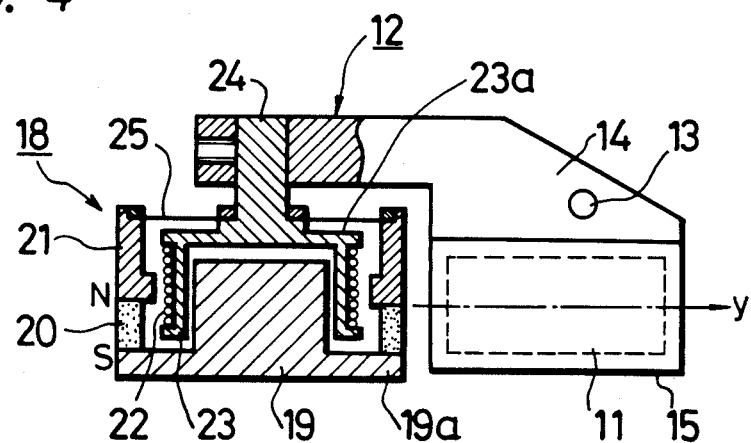

Subsequently, one example of the driving means for the cylindrical lens 11 will be described with reference to FIGS. 3 and 4. FIGS. 3 and 4 are respectively a longitudinal cross-sectional view of driving means 12 for the cylindrical lens 11 and a lateral cross-sectional view thereof. The cylindrical lens 11 is attached to a window frame 15 provided at one side of a lever 14 which is rotated together with a rotary shaft 13 extended in the z axis direction therearound. Reference numeral 16 designates a rotary bearing into which the rotary shaft 13 is inserted and reference numeral 17 designates a bearing therebetween. The rotary bearing 16 is attached to a fixed portion.

To the other side of the lever 14, there is attached a voice coil apparatus 18. This voice coil apparatus 18 is formed of a columnar center yoke 19 attached to the fixed portion, an outer yoke 21 of a cylindrical shape coupled to a circumference of a bottom disk portion 19a of the center york through a cylindrical shape magnet 20, a cylindrical bobbin 23 located between the center yoke 19 and the magnet 20 and the outer yoke 21 and around which a winding 22 is wound, a rod-shaped portion 24 protrusively provided at a ceiling portion 23a of the bobbin 23 and a coil spring 25 extended between the bobbin 23 and the outer yoke 21. Then, the bobbin 23 is attached through the rod-shaped portion 24 to the other side of the lever 14.

Accordingly, if a drive current is flowed to the winding 22, the bobbin 23 is moved in its axial direction, whereby the lever 14 is rotated and accordingly, the cylindrical lens 11 is rotated.

If it is assumed that the length from the rotary shaft 13 to the root of the rod-shaped portion 24 as L and the moving distance of the bobbin 23 as $\Delta Z$, the rotation angle $\theta$ (radian) of the cylindrical lens 11 satisfies the equation, $\theta \approx \Delta Z/L$ where this angle is very small. If L=30 (mm) and $\Delta Z=1$ (mm), $\theta=1.9°$ is established.

Figure 5:
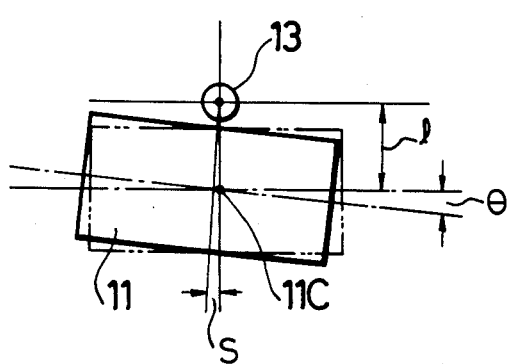
FIG. 5 is a diagram used to explain the same.

While in this embodiment the cylindrical lens 11 is not rotated around the z axis, if the rotary shaft 13 is very close to the z axis, the angle $\theta$ is the very small one within a lens range of about $\pm 1°$, so that it can be judged that the cylindrical lens is rotated around the z axis. In other words, as shown in FIG. 5, if the distance between the center 11C of the plane of the cylindrical lens 11 and the center of the rotary shaft 13 is taken as l and the rotation angle of the cylindrical lens 11 is taken as $\theta$, the moving distance s of the center of the cylindrical lens 11 caused by the rotation thereof is expressed by the following equation.

$$s = l \tan \theta \tag{5}$$

If l=11 (mm) and $\theta=1°$, the moving distance s becomes about 0.2 mm.

Figure 6:
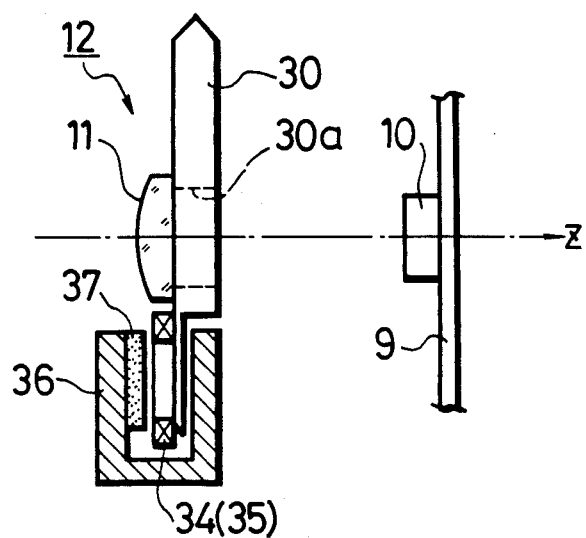
FIGS. 6 and 7 are a longitudinal cross-sectional view of other example of the driving means for the cylindrical lens and a front view showing a part thereof.
Figure 7:
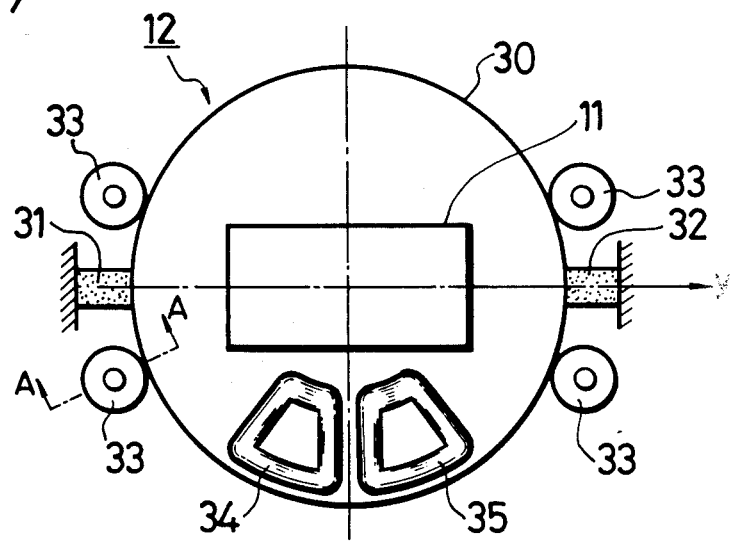
Figure 8:
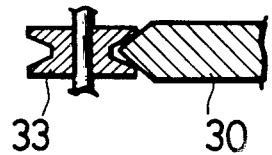
FIG. 8 is a cross-sectional view taken along a line A—A in FIG. 7.

Other examples of the driving means for the cylindrical lens 11 will be described with reference to FIGS. 6, 7 and 8. FIGS. 6 and 7 are a longitudinal cross-sectional view of the driving means 12 for the cylindrical lens 11 and a front view showing a part thereof. FIG. 8 is a cross-sectional view taken long a line A—A in FIG. 7. This driving means 12 comprises a disk plate 30 which is attached through a pair of rubber springs 31 and 32 to the fixed portion and has a central window opening 30a attached with the cylindrical lens 11, four rollers 33 which rotatably guide this disk plate 30 around the center thereof, a pair of windings 34 and 35 attached on one surface of the disk plate 30 at its peripheral edge so as to become symmetrical relative to one diameter thereof and a U-shape yoke 36 in cross-section (attached to the fixed portion) including in its inside a magnet 37 opposing to the windings 34 and 35 and located so as to hold therein the windings 34 and 35.

Accordingly, if a drive current is flowed to the windings 34 and 35, the disk plate 30 is rotated to thereby rotate the cylindrical lens 11.

Figure 9:
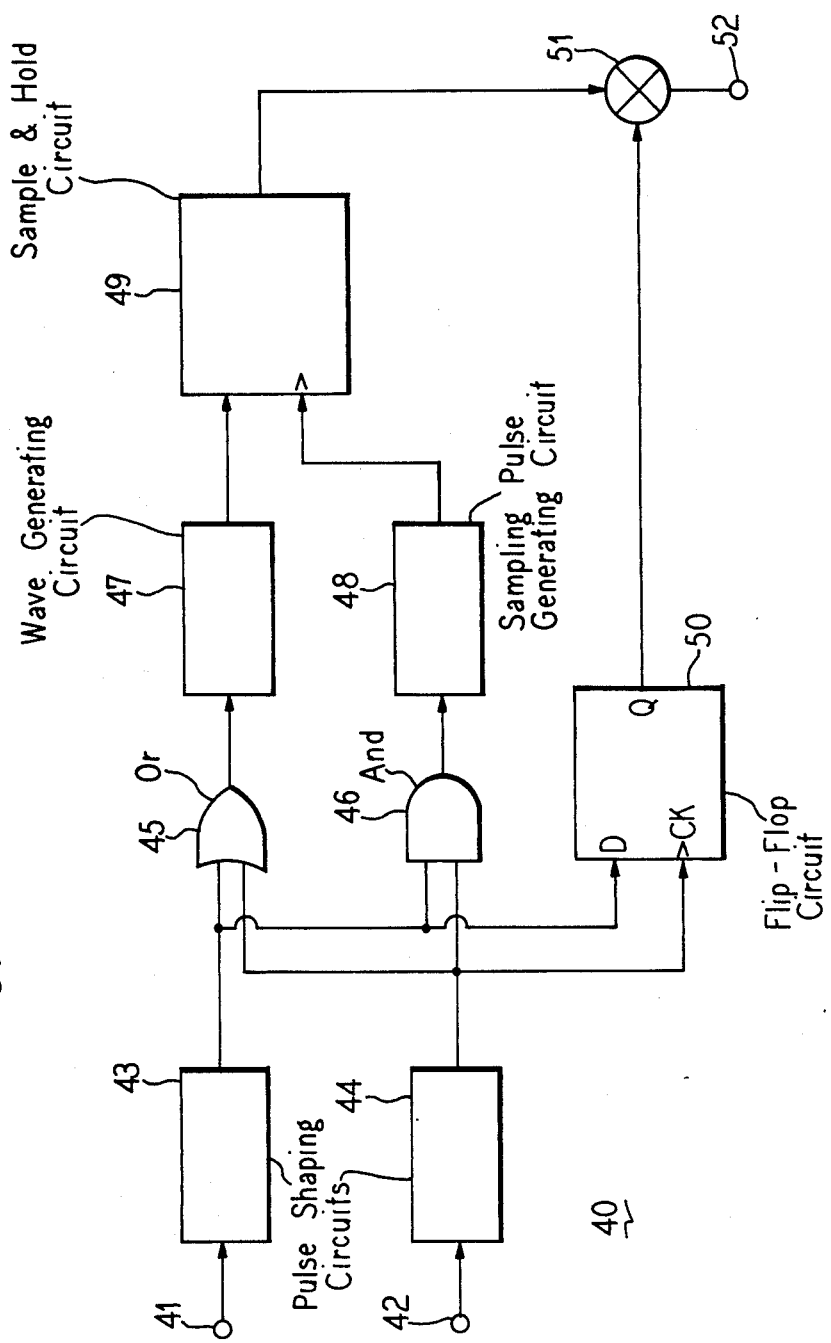
FIG. 9 is a block diagram showing an example of an azimuth error detecting circuit.
Figure 11:
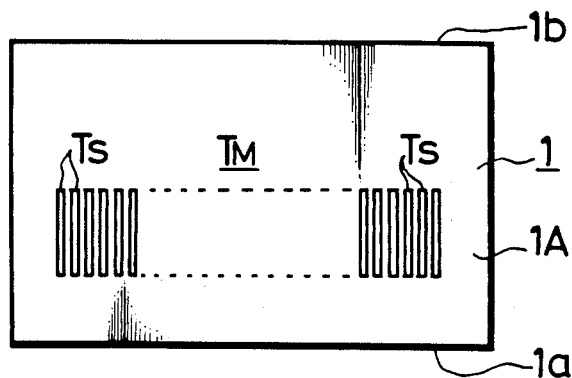
FIG. 11 is a plan view showing an example of a prior art optical type record card.
Figure 12:
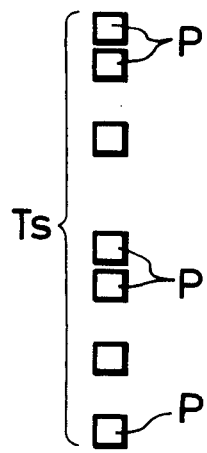
FIG. 12 is a pattern diagram showing its sub-track.
Figure 13:
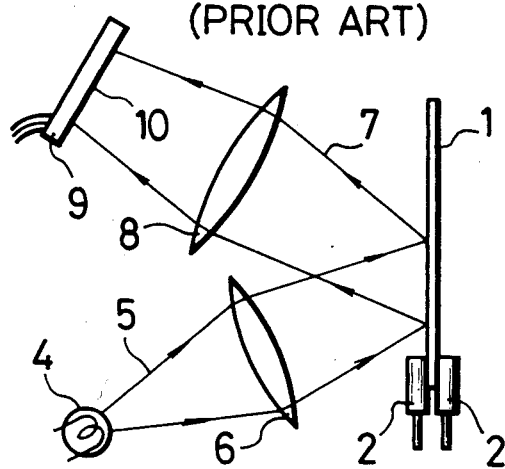
FIGS. 13 and 14 are a locational diagram showing an example of a prior art optical type record card reader and a perspective view showing a part thereof and FIG. 15 is a pattern diagram showing a corresponding relationship between a line sensor and an image of a pit.
Figure 15:
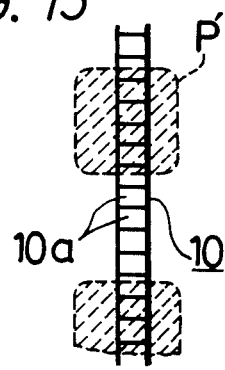
Figure 14:
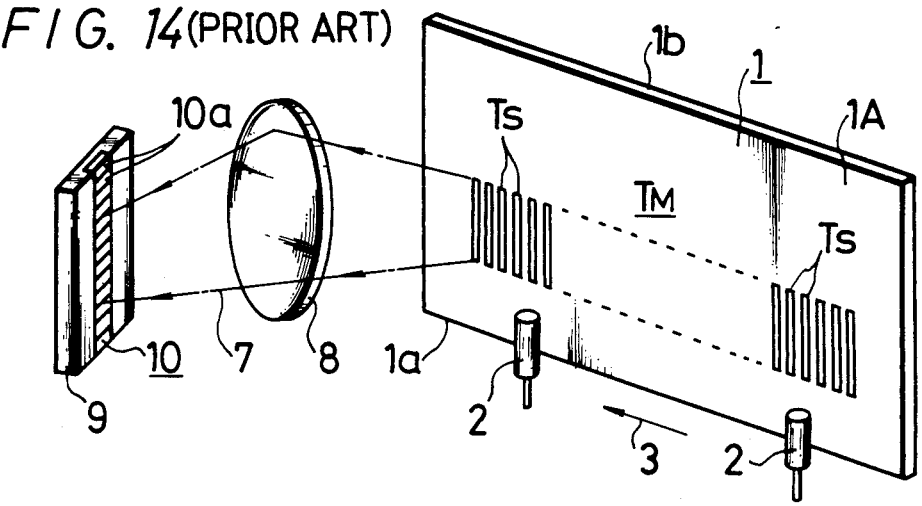

Referring to FIG. 9, an explanation will be given on one example of an azimuth error detecting circuit 40 which detects, when the projected image of the sub-track $T_S$ of the optical type record card 1 onto the line sensor 10 has an azimuth error relative to the line sensor 10, this azimuth error and flows a drive current corresponding to the amount of the azimuth error to the winding of the above mentioned driving means 12.

A header pulse (see FIG. 10A) and a trailer pulse (see FIG. 10B), which are based on one end and the other end of the projected image of the sub-track $T_S$ of the optical type record card 1 onto the line sensor 10 (different photo detector may be possible), are generated from the line sensor 10 and then respectively supplied through input terminals 41 and 42 to pulse shaping circuits 43 and 44 which generate pulses of which the duty ratios are 50%. Both the pulses (see FIGS. 10C and 10D) are supplied to an OR circuit 45 and an AND circuit 46. The respective output pulses from the OR circuit 45 and the AND circuit 46 are shown in FIGS. 10E and 10G, respectively and the time difference between the respective rising edges thereof is equivalent to the azimuth error. Therefore, the output pulse from the OR circuit 45 is supplied to a triangular wave generating circuit 47 in which it is converted to a triangular wave. The resulting triangular wave (see FIG. 10F) is supplied to a sample and hold circuit 49 which is also supplied with a sampling pulse generated by supplying the output pulse of the AND circuit 46 to a sampling pulse generating circuit 48 and corresponding to the rising edge thereof whereby the triangular wave is sampled and then held. FIG. 10H shows the output of the sample and hold circuit 49.

On the other hand, the header pulse and the trailer pulse from the pulse shaping circuits 43 and 44 are supplied to a D input terminal and a clock input terminal of a D-type flip-flop circuit 50 which generates a positive or negative identifying signal in response to whether the trailer pulse is advanced relative or delayed to the header pulse in phase. This identifying signal and the output of the sample and hold circuit 49 are supplied to a multiplier 51 and thereby multiplied with each other. Accordingly, from an output terminal 52, there is derived an azimuth error signal (see FIG. 10I) which has a positive or negative code corresponding to the advanced or delayed phase of the trailer pulse relative to the header pulse.

Accordingly, if such azimuth error signal is amplified at a proper gain and is supplied to the winding 22 or the windings 34 and 35 of the above mentioned driving means 12, it is possible to correct the azimuth error by rotating the cylindrical lens 11 in correspondence with the azimuth error.

According to the present invention as described above, it is possible to obtain an optical type record card reader in which the azimuth error of the projected image of the sub-track of the optical type record card onto the line sensor can be corrected smoothly, highly precisely and rapidly by the rotation of the cylindrical lens.

Further, since the driving means of the cylindrical lens can be constructed small in size and light in weight and thereby the cylindrical lens is driven, the power consumption is small, the response is rapid and the servo is stabilized.

Furthermore, since the cylindrical lens is employed, the power density of the incident light on the line sensor becomes large and the S/N ratio of the reproduced signal becomes large.

We claim:

1. An optical type record card reader, which is characterized by a light source for irradiating tracks of an optical type record card in which an information is recorded on a record medium as a plurality of tracks parallel to one another and which can be read optically, a line sensor for reading said information by a reflected light from said track, a cylindrical lens located between said optical type record card and said line sensor and supported rotatably, an azimuth error detecting circuit for detecting an azimuth error generated between said track and said line sensor, and driving means for rotating said cylindrical lens by a detected output from said azimuth error detecting circuit.

2. An optical type record card reader according to claim 1, which is characterized in that said azimuth error detecting circuit is constructed such that an edge pulse and a trailer pulse are generated from both ends of said track, a positive or negative identifying signal of an azimuth error is generated from a phase difference between said edge pulse and said trailer pulse and that an azimuth error amount is obtained on the basis of a rising time difference of said edge pulse.

3. An optical type record card reader according to claim 2, which is characterized in that said azimuth error detecting circuit is formed of first and second pulse shaping circuits, an AND circuit and an OR circuit to which outputs from said first and second pulse shaping circuits are respectively supplied, a sampling pulse generating circuit for generating a sampling pulse from an output from said AND circuit, a triangular wave generating circuit for converting the output of said OR circuit to a triangular wave, a flip-flop circuit for detecting a phase difference between the outputs from said first and second pulse shaping circuits, and a multiplying circuit for multiplying the output of said sample and hold circuit and the output of said flip-flop circuit.

4. An optical type record card reader according to claim 1, which is characterized in that said driving means is formed of a winding attached to a member which rotatably supports said auxiliary lens and a magnet attached to a yoke so as to oppose to said winding.

5. An optical type record card reader according to claim 4, which is characterized in that the shape of said support member is made as a disk plate, said auxiliary lens is attached to a window opening formed through its central portion, said winding is attached to one surface of said disk plate at its peripheral edge so as to become symmetrical relative to one diameter thereof and said support member is rotatably guided by a plurality of rollers located around the center of said disk plate.

* * * * *